United States Patent
Alzer et al.

(10) Patent No.: US 8,202,935 B2
(45) Date of Patent: Jun. 19, 2012

(54) DISPERSING RESINS COMPRISING POLYETHERS/POLYESTERS

(75) Inventors: Cornelia Alzer, Essen (DE); Pedro Cavaleiro, Viersen (DE); Eberhard Esselborn, Essen (DE); Kathrin Lehmann, Leverkusen (DE); Sascha Oestreich, Essen (DE)

(73) Assignee: Evonik Goldschmidt GmbH, Essen (DE)

( * ) Notice: Subject to any disclaimer, the term of this patent is extended or adjusted under 35 U.S.C. 154(b) by 1577 days.

(21) Appl. No.: 11/341,253

(22) Filed: Jan. 26, 2006

(65) Prior Publication Data

US 2006/0183815 A1 Aug. 17, 2006

(30) Foreign Application Priority Data

Jan. 28, 2005 (DE) .................... 10 2005 004 024

(51) Int. Cl.
- C08G 63/685 (2006.01)
- C08G 69/44 (2006.01)
- C08G 63/66 (2006.01)
- C09D 11/10 (2006.01)

(52) U.S. Cl. ........ 524/599; 524/602; 523/160; 528/332; 106/31.75

(58) Field of Classification Search .............. 523/160, 523/161; 524/599, 602; 528/332; 106/31.75
See application file for complete search history.

(56) References Cited

U.S. PATENT DOCUMENTS

| | | | |
|---|---|---|---|
| 4,224,212 A | | 9/1980 | Topham |
| 5,100,969 A | * | 3/1992 | Yamamoto et al. ........ 525/327.2 |
| 6,787,600 B1 | * | 9/2004 | Thetford et al. .............. 524/599 |
| 2002/0011183 A1 | * | 1/2002 | Esselborn et al. ............ 106/400 |
| 2003/0181544 A1 | * | 9/2003 | Thetford et al. .............. 523/160 |
| 2004/0060473 A1 | * | 4/2004 | Bauer et al. ................. 106/31.13 |
| 2005/0085563 A1 | * | 4/2005 | Esselborn et al. ............ 523/160 |

FOREIGN PATENT DOCUMENTS

| | | |
|---|---|---|
| DE | 197 32 251 B4 | 1/1999 |
| DE | 100 29 648 CI | 2/2002 |
| EP | 0 208 041 B1 | 1/1987 |
| EP | 0 325 054 | 7/1989 |
| EP | 0 358 358 | 3/1990 |
| WO | WO 00/24503 | 5/2000 |
| WO | WO 01/21298 | 3/2001 |
| WO | WO 01/21298 A1 | 3/2001 |
| WO | WO 02/16471 | 2/2002 |

OTHER PUBLICATIONS

EP Search Report for EP 06 00 0768 dated Mar. 7, 2012.

* cited by examiner

*Primary Examiner* — Michael Pepitone
(74) *Attorney, Agent, or Firm* — Frommer Lawrence & Haug LLP

(57) ABSTRACT

The invention provides dispersing resins for solids, obtainable by full or partial reaction of A) one or more amino-functional polymers with
B) one or more polyesters of the general formula (I)/(Ia)

$$T-C(O)-[O-A-C(O)]_x-OH \qquad (I)$$

$$T^1-O-[C(O)-A-O-]_y-Z \qquad (Ia)$$

and

C) one or more polyethers of the general formula (II)/(IIa)

$$T^2-B-Z \qquad (II)$$

$$T-O-B-Z \qquad (IIa).$$

25 Claims, 1 Drawing Sheet

5  Inv.DR = inventive dispersing resin

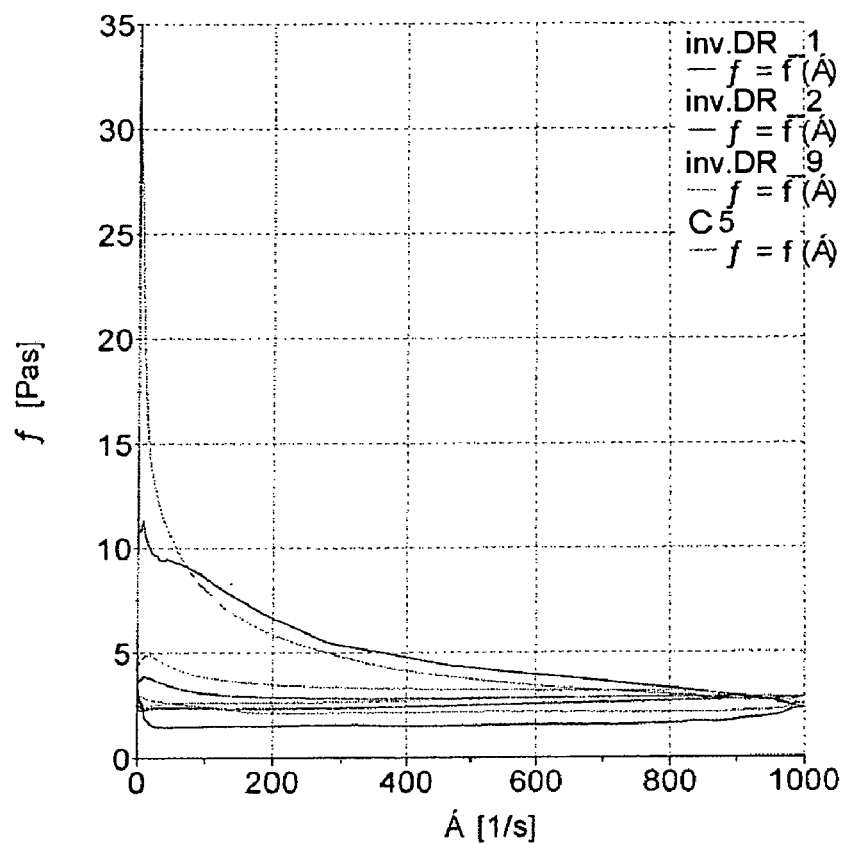
5  Inv.DR = inventive dispersing resin

DISPERSING RESINS COMPRISING POLYETHERS/POLYESTERS

CROSS-REFERENCE TO RELATED APPLICATIONS

The present application claims priority from German Patent Application No. DE 10 2005 004 024.1 filed on Jan. 28, 2005, the disclosure of which is incorporated herein by reference in its entirety.

INCORPORATION BY REFERENCE

Any foregoing applications, and all documents cited therein or during their prosecution ("application cited documents") and all documents cited or referenced in the application cited documents, and all documents cited or referenced herein ("herein cited documents"), and all documents cited or referenced in herein cited documents, together with any manufacturer's instructions, descriptions, product specifications, and product sheets for any products mentioned herein or in any document incorporated by reference herein, are hereby incorporated herein by reference, and may be employed in the practice of the Invention.

Citation or identification of any document in this application is not an admission that such document is available as prior art to the present invention.

It is noted that in this disclosure and particularly in the claims and/or paragraphs, terms such as "comprises", "comprised", "comprising" and the like can have the meaning attributed to it in U.S. Patent law; e.g., they can mean "includes", "included", "including", and the like; and that terms such as "consisting essentially of" and "consists essentially of" have the meaning ascribed to them in U.S. Patent law, e.g., they allow for elements not explicitly recited, but exclude elements that are found in the prior art or that affect a basic or novel characteristic of the invention.

SCOPE OF INVENTION

The invention relates to innovative dispersing resins, to their preparation, and to their use for dispersing solids.

BACKGROUND

For the dispersing of solids (e.g., fillers, dyes or pigments) in liquid media it is regular practice to make use of dispersants in order to achieve effective dispersing of the solids, to reduce the mechanical shear forces required for dispersing, and at the same time to realize very high degrees of filling. The dispersants assist the disruption of agglomerates. As surface-active materials they wet and/or cover the surface of the particles to be dispersed, and stabilize said particles against unwanted reagglomeration.

In the production of paints, varnishes, printing inks, and other coating materials, dispersants facilitate the incorporation of solids, such as fillers and pigments, which are important formulating ingredients and are essential determinants of the visual appearance and of the physicochemical properties of such systems. Optimum utilization requires firstly that these solids be distributed uniformly in the formulations and secondly that the state of distribution, once attained, is stabilized.

A host of different substances are nowadays used as dispersants for solids. In addition to simple low molecular mass compounds such as lecithin, fatty acids and their salts, and alkylphenol ethoxylates, more complex high molecular mass structures are used as dispersants. Amino-functional and amido-functional polymeric systems in particular find broad use here.

U.S. Pat. No. 4,224,212, EP-B-0 208 041, WO-A-00/24503, and WO-A-01/21298, for example, describe dispersants based on polyester-modified polyamines. DE-B-197 32 251 describes polyamine salts and their use as dispersants for pigments and fillers.

Use of these products as dispersing resins, however, also entails a multiplicity of drawbacks: when they are used in pigment pastes, high levels of the dispersing additives are frequently necessary; the achievable levels of pigmentation in the pastes are unsatisfactorily low; the stability of the pastes and hence their consistency of viscosity is inadequate; and flocculation and aggregation cannot always be avoided. In many instances the pastes lack consistency of hue after storage, and lack compatibility with diverse binders. The use of known dispersing additives in many cases also adversely affects the water resistance or light stability of coating materials, and additionally further stabilizes unwanted foam produced in the course of preparation and processing. Additionally, owing to a lack of compatibility of the dispersing resins in numerous letdown vehicles, gloss is often affected undesirably.

There exists, consequently, a growing demand for dispersants for solids that exhibit improved properties when compared with the state of the art. The requirement is for dispersants which will facilitate the dispersion of a multiplicity of solids in different media and provide stability by preventing reagglomeration of the said solids. In turn, the solid will be more uniformly dispersed throughout the liquid media and have better material processability, improved mechanical properties and improved opacity for pigments and dyes. With more effective dispersants, for example, it is possible to reduce the level of high-priced pigments used, without having to accept reductions in color strength.

Moreover, the viscosity characteristics of pastes, paints, varnishes, printing inks, and other coating materials comprising dyes, solids, such as fillers and/or pigments, are critically codetermined by the dispersant used. In particular, a demand exists for dispersants which have a low viscosity, as compared to untreated solids, in the liquid paints and varnishes and also retain such a viscosity. Lower viscosity mixtures have higher throughput and improved processability. Importantly, the use of viscosity-reducing dispersing resins will allow one to use increased loadings of fillers, dyes or pigments.

OBJECTS OF INVENTION

It was therefore an object of the present invention to provide dispersants for solids that exhibit an improved dispersing performance and have a positive influence on the viscosity and rheology of formulations comprising solids.

Surprisingly, it has now been found that the aforementioned object is achieved through new dispersing resins for solids, obtainable by full or partial reaction of
A) one or more amino-functional polymers with
B) one or more polyesters of the general formula (I)/(Ia)

$$T-C(O)-[O-A-C(O)]_x-OH \qquad (I)$$

$$T-O-[C(O)-A-O-]_y-Z \qquad (Ia)$$

and
C) one or more polyethers of the general formula (II)/(IIa)

$$T-C(O)-B-Z \qquad (II)$$

$$T-O-B-Z \qquad (IIa)$$

in which

T is a hydrogen and/or a substituted or unsubstituted, linear or branched aryl, arylalkyl, alkyl or alkenyl radical having 1 to 24 carbon atoms, A is at least one divalent radical selected from the group of linear, branched, cyclic, and aromatic hydrocarbons, Z is at least one radical selected from the group of sulfonic acids, sulfuric acids, phosphonic acids, phosphoric acids, carboxylic acids, isocyanates, epoxides, particularly of phosphoric acid and (meth)acrylic acid, B is a radical of the general formula (III)

$$—(C_LH_{2L}O)_a—(C_mH_{2m}O)_b—(C_nH_{2n}O)_c—(SO)_d— \quad \text{(III)}$$

a, b, and c independently of one another are values from 0 to 100,
with the proviso that the sum of $a+b+c \geq 0$, preferably 5 to 35, in particular 10 to 20, with the proviso that the sum of $a+b+c+d>0$, $d \geq 0$, preferably 1 to 5, L, m, and n independently of one another are $\geq 2$, preferably 2 to 4, and x and y independently of one another are $\geq 2$.

The reaction products can be in the form of the amides and/or of the corresponding salts. Where the moiety "Z" has a multiple bond, as may be the case, for example, for the polyethers and for the polyesters prepared starting from alcohol, in which the terminal OH group has been esterified with an unsaturated acid such as (meth)acrylic acid, the bond occurs via a Michael addition of the NH function across the double bond.

BRIEF DESCRIPTION OF DRAWINGS

FIG. 1: Comparison of viscosity profiles of polyol-based carbon black pastes

DETAILED DESCRIPTION OF INVENTION

The object of the present invention to provide dispersants for solids that exhibit an improved dispersing performance and have a positive influence on the viscosity and rheology of formulations comprising solids. It has now been found that the aforementioned object is achieved through new dispersing resins for solids, obtainable by full or partial reaction of
A) one or more amino-functional polymers with
B) one or more polyesters of the general formula (I)/(Ia)

$$\text{T-C(O)-[O-A-C(O)]}_x\text{—OH} \quad \text{(I)}$$

$$\text{T-O-[C(O)-A-O—]}_y\text{-Z} \quad \text{(Ia)}$$

and
C) one or more polyethers of the general formula (II)/(IIa)

$$\text{T-C(O)-B-Z} \quad \text{(II)}$$

$$\text{T-O-B-Z} \quad \text{(IIa)}$$

in which

T is a hydrogen and/or a substituted or unsubstituted, linear or branched aryl, arylalkyl, alkyl or alkenyl radical, wherein the alkyl or alkenyl radical has 1 to 24 carbon atoms, preferably aryl is phenyl and alkyl or alkenyl has 1-8 carbon atoms, more preferably 1 to 4 carbon atoms, A is at least one divalent radical selected from the group of linear, branched, cyclic, and aromatic hydrocarbons, in one embodiment, the linear or branched hydrocarbon is an alkyl or alkenyl with 1-24 carbon atoms, the cyclic hydrocarbon has from 3-8 carbon atoms and the aromatic hydrocarbon is phenyl; in another embodiment of the invention, the the linear or branched hydrocarbon is an alkyl or alkenyl with 1-8 carbon atoms, the cyclic hydrocarbon has from 5-6 carbon atoms, Z is at least one radical selected from the group of sulfonic acids, sulfuric acids, phosphonic acids, phosphoric acids, carboxylic acids, isocyanates, epoxides, particularly of phosphoric acid and (meth)acrylic acid, B is a radical of the general formula (III)

$$—(C_LH_{2L}O)_a—(C_mH_{2m}O)_b—(C_nH_{2n}O)_c—(SO)_d— \quad \text{(III)}$$

a, b, and c independently of one another are values from 0 to 100,
with the proviso that the sum of $a+b+c \geq 0$, preferably 5 to 35, in particular 10 to 20, with the proviso that the sum of $a+b+c+d>0$, $d \geq 0$, preferably 1 to 5, L, m, and n independently of one another are $\geq 2$, preferably 2 to 4, and x and y independently of one another are $\geq 2$.

Examples of amino-functional polymers include but are not limited to: amino-functional polyamino acids such as polylysine from Aldrich Chemical Co.; amino-functional silicones which are available under the trade name Tegomer® ASi 2122 from Degussa AG; polyamidoamines which are available under the trade names Polypox®, Aradur® or "Starburst®" dendrimers from Aldrich Chemical Co.; polyallylamines and poly(N-alkyl)allylamines which are available under the trade names PAA from Nitto Boseki; polyvinylamines which are available under the trade name Lupamin® from BASF AG; polyalkyleneimines, such as polyethyleneimines, which are available under the trade names Epomin® (Nippon Shokubai Co., Ltd.) and Lupasol® (BASF AG); and polypropyleneimines, which are available under the trade name Astramol® from DSM AG. Further examples of amino-functional polymers constitute the aforementioned systems by crosslinking with amine-reactive groups. This crosslinking reaction takes place, for example, via polyfunctional isocyanates, carboxylic acids, (meth)acrylates, and epoxides. Further examples are poly(meth)acrylate polymers which contain dimethylaminopropyl(meth)acrylamide (Degussa AG) or dimethylaminoethyl (meth)acrylate (Degussa AG) as monomers. One skilled in the art would be aware that other amino-functional polymers are also appropriate.

Amino-functional polymers used typically are those having a molecular weight of 400 g/mol to 600 000 g/mol.

Examples of the radical T include but are not limited to: alkyl radicals having 1 to 24 carbon atoms, such as the methyl, ethyl, propyl, isopropyl, butyl, isobutyl, tert-butyl, hexyl, isohexyl, octyl, nonyl, isononyl, decyl, dodecyl, hexadecyl and octadecyl radical. Examples of unsubstituted or substituted aryl or arylalkyl radicals having up to 24 carbon atoms are the phenyl, benzyl, tolyl or phenethyl radical.

The polyester groups —[O-A-C(O)]$_x$— and —[C(O)-A-O—]$_y$— contain on average more than two ester groups and have an average molecular weight $M_n$ of 100 to 5000 g/mol. Particular preference is given to a value of $M_n$=200 to 2000 g/mol.

In one particularly preferred embodiment of the present invention the polyester group is obtained by conventional methods by ring-opening polymerization with a starter molecule such as T-CH$_2$—OH or T-COOH and one or more lactones, such as β-propiolactone, β-butyrolactone, γ-butyrolactone, 3,6-dimethyl-1,4-dioxane-2,5-dione, δ-valerolactone, γ-valerolactone, ε-caprolactone, γ-caprolactone, 4-methylcaprolactone, 2-methylcaprolactone, 5-hydroxydodecanolactone, 12-hydroxydodecanolactone, 12-hydroxy-9-octadecenoic acid, 12-hydroxyoctadecanoic acid.

Starter molecules such as T-COOH and also the fatty alcohols T-CH$_2$—OH preparable therefrom are preferably the monobasic fatty acids which are customary and known in this field and are based on natural plant or animal fats and oils having 6 to 24 carbon atoms, in particular having 12 to 18 carbon atoms, such as caproic acid, caprylic acid, capric acid, lauric acid, myristic acid, palmitic acid, palmitoleic acid, isostearic acid, stearic acid, oleic acid, linoleic acid, petroselinic acid, elaidic acid, arachidic acid, behenic acid, erucic acid, gadoleic acid, rapeseed oil fatty acid, soybean oil fatty acid, sunflower oil fatty acid, talloil fatty acid, which can be used alone or in a mixture in the form of their glycerides, methyl or ethyl esters, or as free acids, and also the technical mixtures obtained in the course of pressurized cleavage. Suitable in principle are all fatty acids with a similar chain distribution.

The unsaturated content of these fatty acids or fatty acid esters is adjusted, insofar as is necessary, by means of the known catalytic hydrogenation methods to a desired iodine number or is achieved by blending fully hydrogenated with unhydrogenated fatty components.

The iodine number, as an index of the average degree of saturation of a fatty acid, is the amount of iodine absorbed by 100 g of the compound in saturating the double bonds.

Not only the fatty acids but also the resultant alcohols can be modified by addition reaction with alkylene oxides, especially ethylene oxide and/or styrene oxide.

Examples of the polyether units of B are alkylene oxides which include but are not limited to: ethylene oxide, propylene oxide, butylene oxide, styrene oxide, dodecene oxide, tetra-decene oxide, 2,3-dimethyloxirane, cyclopentene oxide, 1,2-epoxypentane, 2-isopropyloxirane, glycidyl methyl ester, glycidyl isopropyl ester, epichlorohydrin, 3-methoxy-2,2-dimethyloxirane, 8-oxabicyclo[5.1.0]octane, 2-pentyloxirane, 2-methyl-3-phenyloxirane, 2,3-epoxypropylbenzene, 2-(4-fluorophenyl)oxirane, tetrahydrofuran, and also their pure enantiomer pairs or enantiomer mixtures.

The group Z may be constructed from adducts which include but are not limited to: carboxylic anhydrides such as succinic anhydride, maleic anhydride or phthalic anhydride.

The weight ratio of polyester to polyether in the dispersing resin of the invention is between 50:1 and 1:9, preferably between 40:1 and 1:5, and more preferably between 30:1 and 1:1.

Further subject-matter of the invention includes the use of the dispersing resins of the invention for dispersing solids in liquid media, and dispersions comprising these dispersing resins, including but not limited to: pigment pastes, coating materials, printing inks and/or print varnishes, for example.

A solid for the purposes of the present invention may in principle be any solid organic or inorganic material.

Examples of such solids include but are not limited to: pigments, fillers, dyes, optical brighteners, ceramic materials, magnetic materials, nanodisperse solids, metals, biocides, agrochemicals, and drugs employed in the form of dispersions.

Preferred solids are pigments as specified, for example, in the Colour Index, Third Edition, Volume 3; The Society of Dyers and Colourists (1982), and in the subsequent, revised editions.

Examples of pigments include but are not limited to: inorganic pigments, such as carbon blacks, titanium dioxides, zinc oxides, Prussian blue, iron oxides, cadmium sulfides, chromium pigments, such as chromates, molybdates, and mixed chromates and sulfates of lead, zinc, barium, calcium, and mixtures thereof. Further examples of inorganic pigments are given in the book by H. Endriss, Aktuelle anorganische Bunt-Pigmente, Vincentz Verlag, Hanover (1997).

Examples of organic pigments include but are not limited to: those from the group of the azo, diazo, condensed azo, Naphtol, metal complex, thioindigo, indanthrone, isoindanthrone, anthanthrone, anthraquinone, isodibenzanthrone, triphendioxazine, quinacridone, perylene, diketopyrrolopyrrole and phthalocyanine pigments. Further examples of organic pigments are given in the book by W. Herbst, K. Hunger, Industrial Organic Pigments, VCH, Weinheim (1993).

Further preferred solids are fillers, such as talc, kaolin, silicas, barytes, and lime; ceramic materials, such as aluminum oxides, silicates, zirconium oxides, titanium oxides, boron nitrides, silicon nitrides, boron carbides, mixed silicon/aluminum nitrides, and metal titanates; magnetic materials, such as magnetic oxides of transition metals, such as iron oxides, cobalt-doped iron oxides, and ferrites; metals, such as iron, nickel, cobalt, and alloys thereof; and biocides, agrochemicals, and drugs, such as fungicides.

Pigment pastes, coating materials, printing inks and/or print varnishes for the purposes of the present invention may be any of a very wide variety of products.

They may for example be systems comprising fillers, pigments and/or dyes. As a liquid medium they may comprise organic solvents and/or water, as is known in the prior art as a function of the binders used. In addition it is also possible to regard binder components as liquid media, such as polyols.

The coating materials, printing inks and/or print varnishes need not, however, necessarily contain a liquid phase, but instead may also be what are known as powder coating materials.

The coating materials, printing inks, and/or print varnishes may also comprise the typical additives such as wetting agents, flow control agents or defoamers, etc., and may cure, crosslink and/or dry by a variety of methods in accordance with the prior art.

Examples of coating materials for the purposes of the present invention include but are not limited to: paints, varnishes, printing inks, and other coating materials, such as solventborne and solvent-free coating materials, powder coating materials, UV-curable coating materials, low-solids, medium-solids, and high-solids automobile finishes, wood varnishes, baking varnishes, 2K [2-component] coating materials, metal-coating materials, and toner compositions. Further examples of coating materials are given in Bodo Müller, Ulrich Poth, Lackformulierung und Lackrezeptur, Lehrbuch für Ausbildung und Praxis, Vincentz Verlag, Hanover (2003) and in P. G. Garrat, Strahlenhartung, Vincentz Verlag, Hanover (1996).

Examples of printing inks and/or print varnishes for the purposes of the present invention are solvent-based printing inks, flexographic inks, gravure inks, letterpress or relief inks, offset inks, lithographic inks, printing inks for packaging printing, screen printing inks, inks for ink-jet printers, ink-jet ink, and print varnishes, such as overprint varnishes.

Examples of printing ink and/or varnish formulations are given in E. W. Flick, Printing Ink and Overprint Varnish Formulations—Recent Developments, Noyes Publications, Park Ridge N.J., (1990) and subsequent editions.

The dispersing resins of the invention can be used in pigment pastes, coating materials, printing inks and/or print varnishes at a concentration of 0.01% to 90.0% by weight, preferably of 0.5% to 35% by weight, and more preferably of 1% to 25% by weight. If desired they can be used in a mixture with prior-art wetting agents and dispersants.

In another embodiment of the invention, the pigment pastes, coating materials, printing inks and/or print varnishes which contain the dispersing resins of the invention have a viscosity of less than about 2000 mPas (10 l/s; 25° C.), preferably less than 1500 mPas (10 l/s; 25° C.).

The invention will now be further described by way of the following non-limiting examples.

EXAMPLES

Preparation of Starting Materials:
Amino-Functional Polymers

Amino-functional polymers used were commercial polyethyleneimines having the molar masses stated in table 3. Further amino-functional polymers used are PEI 1 and PEI 2, whose preparation is described below.

Preparation of Precrosslinked Polyethyleneimine 1 (PEI 1):

6 g (2 mmol) of 1,6-hexanediol diacrylate and 70 g of polyethyleneimines (MW 800 g/mol) were stirred at 70° C. for 12 hours.

Preparation of Precrosslinked Polyethyleneimine 2 (PEI 2):

3 g (2 mmol) of pimelic acid, 0.1 g of tetrabutyl titanate and 45 g of polyethyleneimines (MW 800 g/mol) were stirred at 145° C. for 4 hours, giving a brownish product.

Polyesters
Preparation of Polyester 1:

A mixture of 500 g of ε-caprolactone, 73 g of lauric acid and 0.5 g of tetrabutyl titanate was stirred under inert gas ($N_2$) at 150° C. for 6 hours. This gave a waxy substance having an acid number of 36.0 mg KOH/g. The average chain length is therefore 11.7 monomeric repeating units.

In the same way as for the preparation of polyester 1, the polyesters listed in table 1 were synthesized, numbers showing the molar fractions of the compounds.

TABLE 1

| Polyester | Structure |
|---|---|
| 1 | Lauric acid:ε-caprolactone (1:12) |
| 2 | Stearic acid:ε-caprolactone (1:5) |
| 3 | Capric acid:ε-caprolactone:δ-valerolactone (1:12:4) |
| 4 | Capric acid:ε-caprolactone:δ-valerolactone (1:8:4) |
| 5 | Oleic acid:ε-caprolactone (1:4) |
| 6 | Oleic acid:ε-caprolactone:hydroxydodecanolactone (1:10:2) |
| 7 | Lauryl alcohol:ε-caprolactone:δ-valerolactone (1:5:2) |

Preparation of Acrylate-Modified Polyester 8:

50 g of polyester 7 and 53 g of n-butyl acrylate were introduced as an initial charge in 50 ml of toluene, and 300 ppm of hydroquinone monomethyl ether and 0.5 g of p-toluenesulfonic acid were added.

The batch was stirred with introduction of lean air until the theoretical amount of butanol produced was removed by means of a distillation column. Removal of the solvent and of the excess n-butyl acrylate gave a yellowish oil.

Polyethers:

The preparation of the polyethers below was carried out in accordance with the details in DE-C-100 29 648. The resultant modified polyethers have a general structural formula (VI)

$$[R-O-(SO)_e(EO)_f(PO)_g(BO)_h]_iP(O)(OH)_{3-i} \quad (VI)$$

in which
R=see table 2
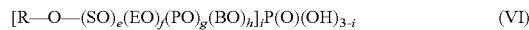  with Ph=phenyl radical
EO=ethylene oxide
PO=propylene oxide
BO=butylene oxide

TABLE 2

| Polyether | R | e | f | g | h | i |
|---|---|---|---|---|---|---|
| I | Isononyl | 4 | 4 | 4 | 0 | 1.0 |
| II | Isononyl | 1 | 5 | 0 | 0 | 1.0 |
| III | Isononyl | 1 | 9 | 0 | 0 | 1.0 |
| IV | Butyl | 3 | 0 | 0 | 2 | 2.5 |
| V | Butyl | 2 | 0 | 4 | 0 | 1.0 |
| VI | Butyl | 0 | 9 | 0 | 0 | 0.4 |

The above sequence of the monomeric alkylene oxides does not constitute any restriction on the resultant polyether structures but instead represents an exemplary listing; reference is expressly made at this point to the fact that polyethers may be constructed, using the abovementioned monomers, both randomly and blockwise. The skilled worker is aware that the modified polyether (VI) has been prepared by means of a phosphorylation reaction and that this reaction proceeds randomly. The value i represents the molar ratio of polyether to phosphate groups. The value i can vary between 0 and 2.9.

Dispersing Resins of the Invention

Example 1

90 g of polyester 1 and 30 g of the amino-functional polymer Lupasol® WF (25 000 g/mol) from BASF AG were stirred, with introduction of $N_2$, at 150° C. for 6 hours. Subsequently at 50° C. 13 g of polyether I were added with stirring. The batch continued to react at 50° C. for 3 hours. This gave the dispersing resin 1, a waxy product.

Examples 2 to 18

Example 1 was repeated using the starting materials listed in table 3.

TABLE 3

| Example | Dispersing resin | Polyester (PES) | Amount [g] | Polyether (PE) | Amount [g] | PEI (Mn) | Amount [g] | Weight PES:PE |
|---|---|---|---|---|---|---|---|---|
| 1 | 1 | 1 | 90.0 | I | 7.2 | 25000 | 7.9 | 11.4:0.9 |
| 2 | 2 | 1 | 416.3 | IV | 14.5 | 5000 | 29.1 | 14.3:0.5 |
| 3 | 3 | 2 | 406.9 | I | 62.6 | 25000 | 75.0 | 5.4:0.8 |
| 4 | 4 | 3 | 352.2 | VI | 29.4 | 10000 | 58.7 | 10.0:0.8 |
| 5 | 5 | 4 | 243.1 | VI | 42.9 | 10000 | 14.3 | 9.0:1.6 |
| 6 | 6 | 4 | 156.5 | II | 36.4 | 10000 | 36.4 | 4.3:1 |

TABLE 3-continued

| Example | Dispersing resin | Polyester (PES) | Amount [g] | Polyether (PE) | Amount [g] | PEI (Mn) | Amount [g] | Weight PES:PE |
|---|---|---|---|---|---|---|---|---|
| 7 | 7 | 4 | 97.0 | II | 15.4 | 10000 | 7.7 | 12.6:2 |
| 8 | 8 | 4 | 463.6 | II | 33.7 | 5000 | 25.9 | 17.9:1.3 |
| 9 | 9 | 4 | 61.6 | II | 9.2 | 5000 | 6.1 | 10.1:1.5 |
| 10 | 10 | 4 | 266.0 | II | 14.0 | 1200 | 20.0 | 13.3:0.7 |
| 11 | 11 | 4 | 327.6 | II | 79.9 | 1200 | 42.0 | 7.8:1.9 |
| 12 | 12 | 4 | 661.0 | III | 33.0 | 10000 | 66.1 | 10.0:0.5 |
| 13 | 13 | 8 | 409.9 | II | 19.9 | 10000 | 39.8 | 10.3:0.5 |
| 14 | 14 | 4 | 409.9 | II | 19.9 | 5000 | 39.8 | 10.3:0.5 |
| 15 | 15 | 4 | 409.9 | II | 19.9 | 1200 | 39.8 | 10.3:0.5 |
| 16 | 16 | 5 | 51.7 | V | 18.8 | 10000 | 12.5 | 4.1:1.5 |
| 17 | 17 | 5 | 288.8 | II | 10.1 | PEI 1 | 52.6 | 5.5:0.2 |
| 18 | 18 | 6 | 288.8 | II | 10.1 | PEI 2 | 20.2 | 14.3:0.5 |

Comparative Examples

Preparation of Comparative Examples C 1

103 g of polyether I and 30 g of Lupasol WF from BASF AG were stirred at 150° C. for 6 hours, giving a waxy product referred to below as comparative example C 1.

Comparative example C 2 is a mixture (50% by weight: 50% by weight) of compound C 1 and the amino-functional polyester Tego Dispers® 681 UV.

Dispersants used as well, in accordance with the prior art, were the following dispersants C 3 to C 6:

Commercial Amino-Functional Polyesters:
Comparative example C 3: Solsperse® 24000 (Lubrizol Corp.)
Comparative example C 4: Solsperse® 32000 (Lubrizol Corp.)
Comparative example C 5: Solsperse® 39000 (Lubrizol Corp.)
Comparative example C 6: Tego Dispers® 681 UV (Tego Chemie Service GmbH)

Performance Examples

Test Pigments

From the multiplicity of possible solids the following commercial pigments were selected: Raven® 450 (Columbia Chemicals Co.) and Spezialschwarz® 250 (Degussa AG) as carbon black pigments, and Hostaperm® Violet P-RL (Clariant International Ltd.) and Irgalit® Yellow BAW (Ciba) as typical chromatic pigments.

Test Coating Materials

The dispersing resins and solids were compared in the following formulas for coatings, printing inks and/or print varnishes:

TABLE 4

Formula for UV-curing flexographic ink

| Raw materials | Organic chromatic pigments % by weight | Carbon black pigments % by weight |
|---|---|---|
| Ebecryl ® 812 (UCB) | 25.75 | 25.08 |
| Ebecryl ® 220 (UCB) | 6.57 | 6.40 |
| Laromer ® TPGDA (BASF) | 29.02 | 28.27 |
| Laromer ® TMPTA (BASF) | 16.27 | 15.85 |
| Dispersing resin or comparative example | 1.77 | 2.39 |
| Pigment | 11.79 | 13.40 |
| Airex ® 920 (Tego) | 0.98 | 0.96 |
| Irgacure ® 1300 (Ciba) | 5.89 | 5.74 |
| Darocure ® 1173 (Ciba) | 1.96 | 1.91 |
| Total | 100.00 | 100.00 |

The ratio of amount of pigment to amount of dispersing additive was kept constant in all experiments, as a function of pigment. The dispersing additive/pigment ratio was 17.8% additive to pigment in the case of carbon black pigments and 15% additive to pigment in the case of organic chromatic pigments.

TABLE 5

Formula for white, UV-curable tinting paint

| Raw material | % by weight |
|---|---|
| Ebecryl ® 812 (UCB) | 30.0 |
| Ebecryl ® 220 (UCB) | 8.6 |
| Laromer ® TPGDA (BASF) | 19.4 |
| Laromer ® TMPTA (BASF) | 12.9 |
| Kronos ® 1075 (KRONOS Int.) | 25.7 |
| Airex ® 920 (Tego) | 0.6 |
| Irgacure ® 819 (Ciba) | 1.4 |
| Darocure ® 1173 (Ciba) | 1.4 |

Preparation:

The formula ingredients are weighed out in accordance with the above formulas into 250 ml screw top glass jars, and glass beads are added (100 g glass beads to 100 g millbase). The sealed jars are then shaken in a Skandex mixer (Skandex; model: BA-S20) at 620 rpm for 2 h, during which temperatures up to 50° C. can be reached. The glass beads are subsequently separated using a sieve from the dispersed printing ink.

Comparison of Tinted UV-Curable Flexographic Ink with Dispersing Resins of the Invention Examples 19 to 37

Tinted UV-Curable Flexographic Ink:

For more effective assessment of the color strengths, the UV-curable flexographic ink was blended with the white tinting paint. The blends were made in a ratio of 20:1 (41.67 g white pigment to 1 g organic chromatic pigment; and 35.71 g white pigment to 1 g carbon black pigment). Thereafter the mixture is homogenized in a universal shaker (Hausschild Engineering, DAC 150 Dual Asymmetric Centrifuge) for 1 minute.

Application:

The tinted UV-curable flexographic inks were knife-coated onto white card (Leneta) using an applicator (24 μm). Drying took place with a 120 W/cm medium-pressure mercury vapor lamp (Beltron GmbH, Beltron UV lamp). The speed of the conveyor belt was 8 m/min.

Test Methods:

In order to evaluate the rheology, the performance of the dispersants, the attained color strengths, and viscosity, were plotted together.

Viscosity Measurement:

The rheology of the UV-curable flexographic ink thus prepared is determined by means of a rotational viscometer. The measurement system chosen was a plate/cone system (Euro Physics, Rheo 2000 RC20, 45 μm, angle 1°; 25° C. measurement temperature).

The following shear rate was chosen:
10 to 90 $s^{-1}$ in 30 s
100 to 1000 $s^{-1}$ in 40 s
1000 to 1000 $s^{-1}$ in 30 s
1000 to 100 $s^{-1}$ in 40 s
100 to 10 $s^{-1}$ in 30 s
90 to 10 $s^{-1}$ in 30 s The samples were compared with one another using the viscosity values measured in the outward curve at the low shear rate 10 $s^{-1}$, since it was here that the greatest differences were observed.

Colorimetry:

Colorimetry on the white blend (24 μm film thickness of Leneta card) was performed using an instrument from the company X-Rite (model: X-Rite SP 60). For all samples the $L^*a^*b^*$ values of the CIE-Lab system (CIE=Commission Internationale de l'Eclairage) were determined. The CIE-Lab system is useful as a three-dimensional system for the quantitative description of color loci. On one axis in the system the colors green (negative a* values) and red (positive a* values) are plotted, on the axis at right angles thereto the colors blue (negative b* values) and yellow (positive b* values). The value C* is composed of a* and b* as follows: $C^*=(a^{*2}+b^{*2})^{0.5}$ and is used to describe violet color loci. The two axes intersect one another at the achromatic point. The vertical axis (achromatic axis) is relevant for the lightness, from white (L=100) to black (L=0). Using the CIE-Lab system it is possible to describe not only color loci but also color spacings, by stating the three coordinates.

Dispersing resins 1 to 19 were tested in UV-curable flexographic ink with the carbon black pigment Spezialschwarz® 250 as described above. The results are shown in table 6 and demonstrate that the dispersing resins of the invention exhibited lower L* values (lightness value) than the comparative compounds. The desire here is for low L* values. The reported values in the results tables are in each case mean values from three measurements.

TABLE 6

Comparison in UV-curable flexographic ink with Spezialschwarz ® 250 pigment

| Example | Dispersing resin | L* |
|---|---|---|
| 19 | 1 | 50.25 |
| 20 | 2 | 50.03 |

TABLE 6-continued

Comparison in UV-curable flexographic ink with Spezialschwarz ® 250 pigment

| Example | Dispersing resin | L* |
|---|---|---|
| 21 | 3 | 50.71 |
| 22 | 4 | 50.84 |
| 23 | 5 | 50.24 |
| 24 | 6 | 50.83 |
| 25 | 7 | 50.56 |
| 26 | 8 | 50.93 |
| 27 | 9 | 50.72 |
| 28 | 10 | 50.76 |
| 29 | 11 | 50.14 |
| 30 | 12 | 50.35 |
| 31 | 13 | 50.48 |
| 32 | 14 | 50.90 |
| 33 | 15 | 50.50 |
| 34 | 16 | 50.59 |
| 35 | 17 | 50.65 |
| 36 | 18 | 51.09 |
| 37 | 19 (combination of 14 + 18; 50% by wt.:50% by wt.) | 51.23 |
| Comparative example | C 1 | 52.31 |
| Comparative example | C 2 | 51.69 |

Example 38

TABLE 7

Comparison in UV-curable flexographic ink with Raven ® 450 pigment

| Raven ® 450 | L* | Viscosity in mPas (10 1/s; 25° C.) |
|---|---|---|
| Blank sample | 82.24 | 2491 |
| Comparative example C 1 | 73.02 | 1603 |
| Comparative example C 4 | 66.45 | 1367 |
| Comparative example C 5 | 70.07 | 1587 |
| Comparative example C 6 | 65.89 | 1355 |
| Dispersing resin 1 | 63.96 | 959 |

TABLE 8

Comparison in UV-curable flexographic ink with Spezialschwarz ® 250 pigment

| Spezialschwarz ® 250 | L* | Viscosity in mPas (10 1/s; 25° C.) |
|---|---|---|
| Blank sample | 59.18 | 962 |
| Comparative example C 1 | 52.31 | 901 |
| Comparative example C 4 | 50.50 | 348 |
| Comparative example C 5 | 50.57 | 316 |
| Comparative example C 6 | 50.49 | 304 |
| Dispersing resin 1 | 50.25 | 261 |

The desire here is for low L* (lightness values) and a low viscosity under low shearing loads. It is apparent that the dispersing resins used in accordance with the invention, relative to the noninventive, comparative examples, exhibit lower L* values and a lower viscosity for a given shear rate.

The positive properties of the dispersing resin used in accordance with the invention are not only confined to black pigments but also extend to the other solids typically used in the art. The skilled worker is aware that yellow pigments and violet pigments, in particular, are difficult to disperse. Below, therefore, as examples of the universal applicability of the dispersing resins, the yellow pigment Irgalite® Yellow BAW (Ciba) and Hostaperm® Violet P-RL (Clariant International Ltd.) are used.

TABLE 9

Comparison in UV-curable flexographic ink with Hostaperm ® Violet P-RL pigment

| Hostaperm ® Violet P-RL | C* | Viscosity in mPas (10 1/s; 25° C.) |
|---|---|---|
| Blank sample | 34.82 | 1061 |
| Comparative example C 1 | 35.04 | 989 |
| Comparative example C 4 | 37.25 | 583 |
| Comparative example C 5 | 37.47 | 666 |
| Comparative example C 6 | 37.32 | 592 |
| Dispersing resin 1 | 37.77 | 523 |

The desire here is for high C* values (violet values) and lower viscosity at low shearing loads. It is apparent that the dispersing resin used in accordance with the invention, as compared with the noninventive, comparative examples, exhibits a low viscosity and a higher C* value.

TABLE 10

Comparison in UV-curable flexographic ink with Irgalite ® Yellow BAW

| Irgalite ® Yellow BAW | b* | Viscosity in mPas (10 1/s; 25° C.) |
|---|---|---|
| Blank sample | 26.05 | 3084 |
| Comparative example C 1 | 37.94 | 2021 |
| Comparative example C 4 | 49.04 | 1447 |
| Comparative example C 5 | 46.97 | 1843 |
| Comparative example C 6 | 48.98 | 1458 |
| Dispersing resin 1 | 49.70 | 1457 |

The desire here is for high b* values (yellow values) and low viscosity at low shearing loads. It is apparent that the dispersing resin used in accordance with the invention, as compared with the noninventive, comparative examples of the prior art, exhibits a lower viscosity and a higher b* value.
Comparison of Binder-Containing Dispersion of Pigments Example 39

The inventive dispersing resins 1 to 18 of table 3 was compared with the noninventive, comparative examples in a binder-containing dispersion of pigments tested for their producibility in accordance with the mixture of 50 g of polyol, 25 g of dispersant (inventive or noninventive) and 25 g of carbon black. The mixing of the three aforementioned components is carried out together with 100 g of glass beads in a 250 g glass vessel for 8 hours on the Skandex.

Typical polyols employed here are available from a large number of manufacturers, such as, for example, from the companies Bayer, Dow, BASF, and others, and can in principle be described by way of an average molecular weight of 1000 to 8000 g/mol with a hydroxyl number in the range from 15 to 70, via which it is possible, with the corresponding curing agent and polyol/curing agent ratio, to adjust the technical properties (chemical resistance, hardness, flexibility of the material, etc.).

Polyol-based pigment pastes of this kind may be employed subsequently in a multiplicity of applications. The pastes are not restricted only to use in paints, inks, and coating materials, but can also be used, for example, for glass fiber-reinforced plastics, injection molding applications, polyurethane foams, and plastic components. The polyols used here are polyether polyols. However, the use of the dispersing resins/dispersants claimed in accordance with the invention is in no way confined to polyether polyols; instead, other kinds of polymers as well, which can be utilized together with the compounds of the invention as a liquid medium for dispersing solids, are also claimed in one particular embodiment of this patent. As further examples of such polymers it is possible to utilize not only polyether polyols but also polyester polyols, or solids of any kind can be used in other systems, such as nitrocellulose, as a dispersion matrix.

For the carbon blacks a multiplicity of products are suitable; mention may be made here, by way of example, of the products Monarch®570 (Cabot), Monarch®870 or Printex®60 (Degussa), which, however, do not constitute any restriction at all on the products with regard to the action of the compounds of the invention, and the activity window of the compounds of the invention is also illustrated only with carbon black as an example, but is not confined only to this pigment group.

The producibility of the pastes is assessed in the form of the viscosity, and the pastes, where appropriate, are subjected to Theological measurement.

The rheology is determined by means of a Haake Rheostressl rotational viscometer, with a plate/cone system and the test element HC 35 being chosen. The measurements are carried out at 23° C. using the following program:
0.1 to 10 1/s in 10 s, 10 measurement points
10 to 1000 1/s in 50 s, 50 measurement points
1000 to 10 1/s in 50 s, 50 measurement points
10 to 0.1 1/s in 10 s, 10 measurement points The fine division of the pigment pastes is assessed by means of a Grindometer from Byk Gardner and reported in the form of micrometers. This is the determination method of DIN EN 21524: 1991-09.

Pastes which exhibit a viscosity of less than 5000 mPas in the low shear rate range and whose fine division is below 12 μm are utilized for the coloring of the following coating systems (see tables 11 and 12).

TABLE 11

White, two-component polyurethane paint

| Raw materials | Initial mass in g |
|---|---|
| Desmophen ® AVPLS 2350 binder (Bayer AG) | 462.0 |
| KRONOS ® 2310 titanium dioxide (KRONOS Int.) | 369.6 |
| Xylene | 25.0 |
| Methoxypropyl acetate (MPA) | 25.0 |
| Butyl acetate (BuAc) | 25.0 |
| The five above components are dispersed in a 2 l dispersing pot with 700 g of beads for 2 hours at 10 m/s and the remaining components are added afterward | |
| Tegokat 219 catalyst (81% in xylene) (Goldschmidt TIB GmbH) | 13.4 |
| Solvent mixture xylene/MPA/BuAc 1:1:1 | 76.2 |

For the curing of the system, 150 g of millbase are then mixed with 25.5 g of curing component in the form of Desmodur® N 3390 BA (Bayer). 3.51 g of the above-described binder-containing carbon black dispersion are added to this mixture, and the resulting lightness values L* (see table 12) are recorded. Curing of the system, applied at 150 μm using a blade applicator, is accomplished by subjecting the system, after a 10-minute flash-off time at room temperature, to forced drying at 60° C. for 30 minutes.

TABLE 12

White alkyd resin paint

| Raw materials | Initial mass in g |
|---|---|
| AlkydalF ® 681 binder (75% in white spirit) (Bayer AG) | 280.0 |
| KRONOS ® 2065 titanium dioxide (KRONOS Int.) | 300.0 |
| Solvent: white spirit | 90.0 |
| The three components above are dispersed in a dispersing pot at 18 m/s for 30 minutes with cooling and then mixed with the following ingredients, with stirring | |
| AlkydalF ® 681 binder (75% in white spirit)(Bayer AG) | 255.8 |
| Nuodex Ca dryer (5%) (Elementis Specialties, Inc.) | 2.0 |
| Nuodex Zr dryer (12%) (Elementis Specialties, Inc.) | 3.0 |
| Nuodex Co dryer (6%) (Elementis Specialties, Inc.) | 3.2 |
| Ascinin R 55 antiskinning agent (Borchers) | 0.8 |

The resulting white alkyd resin paint can then be colored using the carbon black dispersions prepared, and the results set out in table 13 are those for a mixture of 25.0 g of white paint and 0.5 g of polyol-based 25% carbon black paste.

TABLE 13

Producibility of the polyol-based carbon black pastes (Printex ® 60 pigment) and L* values of the colored 2K PU paints

| Dispersing resin | Carbon black paste (S/U) | Fine division (µm) | Lightness value L* |
|---|---|---|---|
| Comparative example C 3 | U | n/a | n/a |
| Comparative example C 4 | U | n/a | n/a |
| Comparative example C 5 | U | n/a | n/a |
| Comparative example C 6 | U | n/a | n/a |
| 1 | S | <10 µm | 56.8 |
| 2 | S | <12 µm | 55.4 |
| 5 | S | <10 µm | 54.2 |
| 6 | S | <8 µm | 54.1 |
| 12 | S | <12 µm | 55.8 |
| 18 | S | <10 µm | 54.7 |

U = unsatisfactory;
S = satisfactory;
n/a = not applicable.

It is clear that the noninventive compounds do not allow a 25% carbon black dispersion in polyol to be produced at all, as illustrated by the designation U (unsatisfactory). Coloring of the paint is therefore not applicable. The inventive dispersing resins, on the other hand, have no problem in lowering the dispersing viscosity in such a way as to result in pastes which are well below 5000 mPas, and the corresponding fine division figures also illustrate the effective dispersion of the carbon blacks. The extremely low L* values for the 2K PU systems produced using the compounds of the invention are therefore also unsurpassed.

TABLE 14

Coloring of alkyd resin paint with binder-containing carbon black pastes

| Dispersing resin | Lightness value L* |
|---|---|
| 1 | 59.8 |
| 2 | 60.7 |
| 5 | 61.0 |
| 7 | 59.7 |
| 9 | 60.3 |
| 15 | 60.8 |
| 18 | 61.2 |

As already clear from table 12, the compounds of the invention exhibit a strikingly different profile of properties from the noninventive, comparative examples, such that only with compounds of the invention is it possible to produce low-viscosity 25% carbon black pastes. As a result, it is possible to cite lightness values only for the alkyd paints colored on the basis of the compounds of the invention in table 13.

With comparative example C 5 it is likewise not possible to produce a 25% carbon black paste in the polyol, although a paste with 19% carbon black, in accordance with the mixture of 50 g polyol/15 g carbon black/15 g dispersing resin, is possible. The resultant L* values for the coloring of the paints are therefore given here:
2K PU paint: L*=60.1
Alkyd resin paint: L*=70.3
but only make it all the more clear what significant advantages are afforded by the compounds of the invention as dispersing resins, both in the context of the production of pastes, shown here using the example of polyol-based carbon black pastes, as one of the most difficult dispersing systems, and with reference to the use of such pastes for different hydrophobic paint systems.

FIG. 1 shows the low viscosities of some inventive examples as 25%, polyol-based carbon black pastes. In comparison, the viscosity of the only 19% carbon black paste that was able to be produced, namely comparative example C5, is stated; the viscosity of this paste is already much higher and would be unmanageable in a production operation.

At a shear rate of 50 [l/s] the viscosity sequence of the pastes is as follows: comparative example 5 (highest viscosity), dispersing resin 2, dispersing resin 9, dispersing resin 1 (lowest viscosity).

FIG. 1 shows not only viscosity curves with an increasing shear rate (0-1000 [l/s]) but also those with a falling shear rate (1000-0 [l/s]) (known as return curves, allowing an assessment of the thixotropy). The dispersing resins 9 and 1 are therefore considered of particular interest not only on account of the lower viscosity level, with a virtually newtonian pattern, but also on account of the almost complete absence of thixotropy.

Having thus described in detail the various embodiments of the present invention, it is to be understood that the invention defined by the above paragraphs is not to be limited to particular details set forth in the above description as many apparent variations thereof are possible without departing from the spirit or scope of the present invention.

What is claimed is:

1. A dispersing resin obtainable by full or partial reaction of
A) one or more amino-functional polymers with
B) one or more polyesters of the general formula (I)/(Ia)

$$T\text{-}C(O)\text{---}[O\text{-}A\text{-}C(O)]_x\text{---}OH \quad (I)$$

$$T\text{-}O\text{---}[C(O)\text{-}A\text{-}O\text{---}]_y\text{---}Z \quad (Ia)$$

and

C) one or more polyethers of the general formula (II)/(IIa)

$$T-C(O)-B-Z \quad (II)$$

$$T-O-B-Z \quad (IIa)$$

in which
T is a hydrogen and/or a substituted or unsubstituted, linear or branched aryl, arylalkyl, alkyl or alkenyl radical wherein the alkyl or alkenyl radical has 1 to 24 carbon atoms,
A is at least one divalent radical selected from the group consisting of linear, branched, cyclic, and aromatic hydrocarbons,
Z is at least one radical selected from the group consisting of sulfonic acids, sulfuric acids, phosphonic acids, phosphoric acids, carboxylic acids, isocyanates, and epoxides,
B is a radical of the general formula (III)

$$-(C_LH_{2L}O)_a-(C_mH_{2m}O)_b-(C_nH_{2n}O)_c-(SO)_d- \quad (III)$$

a, b, and c independently of one another are values from 0 to 100, with the proviso that the sum of $a+b+c \geq 0$ and that the sum of $a+b+c+d > 0$
$d \geq 0$
L, m, and n independently of one another are $\geq 2$
x and y independently of one another are $\geq 2$.

2. The dispersing resin of claim 1, wherein
(i) a+b+c is between 5 to 35,
(ii) d is between 1 to 5 and
(iii) l, m and n are each between 2 to 4.

3. The dispersing resin as claimed in claim 1, wherein the amino-functional polymer is at least one compound selected from the group consisting of amino-functional polyamino acids, amino-functional silicones, polyamidoamines, polyallylamines and poly(N-alkyl)allylamines, polyvinylamines, and polyalkyleneimines.

4. The dispersing resin as claimed in claim 1, wherein the amino-functional polymer is crosslinked by reaction of some of the amino groups with one or more polyfunctional compounds selected from the group consisting of isocyanates, carboxylic acids, (meth)acrylates, and epoxides.

5. The dispersing resin as claimed in claim 1, wherein the amino-functional polymer has a molecular weight of 400 g/mol to 600 000 g/mol.

6. The dispersing resin as claimed in claim 1, wherein the polyester groups are obtained by ring-opening polymerization of one or more lactones selected from the group consisting of β-propiolactone, β-butyrolactone, γ-butyrolactone, 3,6-dimethyl-1,4-dioxane-2,5-dione, δ-valerolactone, γ-valerolactone, ε-caprolactone, γ-caprolactone, 4-methylcaprolactone, 2-methyl-caprolactone, 5-hydroxydodecanolactone, 12-hydroxydodecanolactone, 12-hydroxy-9-octadecenoic acid, 12-hydroxyoctadecanoic acid.

7. The dispersing resin as claimed in claim 1, wherein the polyester groups have an average molecular weight $M_n$ of 100 to 5000 g/mol.

8. The dispersing resin as claimed in at least one of claim 1, wherein the polyether radicals are, independently of one another, selected from the group consisting of ethylene oxide, propylene oxide, butylene oxide, dodecene oxide, tetradecene oxide, 2,3-dimethyloxirane, cyclopentene oxide, 1,2-epoxypentane, 2-isopropyloxirane, glycidyl methyl ester, glycidyl isopropyl ester, epichlorohydrin, 3-methoxy-2,2-dimethyloxirane, 8-oxabicyclo[5.1.0]octane, 2-pentyloxirane, 2-methyl-3-phenyloxirane, 2,3-epoxypropylbenzene, 2-(4-fluorophenyl)oxirane, and also their pure enantiomer pairs or enantiomer mixtures.

9. A binder-containing or binder-free pigment paste, coating material, printing ink and/or print varnish which further comprises the dispersing resin as claimed in claim 1.

10. A dispersion of a solid in a liquid medium, comprising at least one dispersing resin as claimed in claim 1.

11. The dispersion of solid of claim 10, wherein the solid is selected from the group consisting of pigments, fillers, dyes, optical brighteners, ceramic materials, magnetic materials, nanosisperse solids, metals, biocides, agrochemicals, and drugs.

12. The dispersion of solid of claim 11, wherein the pigment is an inorganic pigment selected from the group consisting of carbon blacks, titanium dioxides, zinc oxides, Prussian blue, iron oxides, cadmium sulfides and chromium pigments.

13. The dispersion of solid of claim 11, wherein the pigment is an organic pigment selected from the group consisting of azo, diazo, condensed azo, naphtol, metal complex, thioindigo, indanthrone, isoindanthrone, anthanthrone, anthraquinone, isobenzanthrone, triphexdioxazine, quinacridone, perylene, diketopyrrolopyrrole and phtalocyanine pigments.

14. The dispersion of solid of claim 11, wherein the filler is selected from the group consisting of talc, kaolin, silicas, barytes, and lime.

15. A method of lowering the viscosity of a solid in a liquid medium by addition of the dispersing resin claimed in claim 1.

16. A method of facilitating the dispersion of a solid in a liquid medium by addition of the dispersing resin claimed in claim 1.

17. A method of producing pastes with exhibit a viscosity of less than 5000 mPas in the low shear rate range and whose fine division is below 12 μm by addition of the dispersing resin claimed in claim 1.

18. The dispersion of solid in claim 10 where the liquid medium is an organic solvent, water or a polyol.

19. The dispersing resin of claim 1, wherein Z is at least one radical selected from the group consisting of phosphoric acid and (meth)acrylic acid.

20. The dispersing resin of claim 1, wherein one or more polyesters is a polyester of formula (I).

21. The dispersion of solid of claim 11, wherein the ceramic material is selected from the group consisting of aluminum oxides, silicates, zirconium oxides, titanium oxides, boron nitrides, silicon nitrides, boron carbides, mixed silicon/aluminum nitrides, and metal titanates.

22. The dispersion of solid of claim 11, wherein the magnetic material is a magnetic oxide of a transition metal.

23. The dispersion of solid of claim 22, wherein the magnetic oxide of a transition metal is selected from the group consisting of iron oxides, cobalt-doped iron oxides, and ferrites.

24. The dispersion of solid of claim 11, wherein the metal is selected from the group consisting of iron, nickel, cobalt, and alloys thereof.

25. The dispersion of solid of claim 11, wherein the drug is a fungicide.

* * * * *